April 17, 1928.

A. E. PEW, JR., ET AL 1,666,301

PROCESS AND APPARATUS FOR DISTILLING MINERAL OIL

Filed Feb. 23, 1924 — 2 Sheets-Sheet 1

WITNESS:

INVENTORS
Arthur E. Pew, Jr. and
Henry Thomas
BY
ATTORNEYS.

April 17, 1928.  
A. E. PEW, JR., ET AL  
1,666,301  
PROCESS AND APPARATUS FOR DISTILLING MINERAL OIL  
Filed Feb. 23, 1924  
2 Sheets-Sheet 2

INVENTORS  
*Arthur E. Pew, Jr. and*  
*Henry Thomas*  
BY  
*Busser and Harding*  
ATTORNEYS.

WITNESS:

Patented Apr. 17, 1928.

1,666,301

UNITED STATES PATENT OFFICE.

ARTHUR E. PEW, JR., OF BRYN MAWR, AND HENRY THOMAS, OF RIDLEY PARK, PENNSYLVANIA, ASSIGNORS TO SUN OIL COMPANY, OF PHILADELPHIA, PENNSYLVANIA, A CORPORATION OF NEW JERSEY.

PROCESS AND APPARATUS FOR DISTILLING MINERAL OIL.

Application filed February 23, 1924. Serial No. 694,472.

Our invention comprises an apparatus and process for distilling mineral oil in which part of a highly heated flowing stream of oil is brought into heat exchange relation, while maintained out of physical contact, with another advanced part of the same flowing stream, in such manner as to effect fractional distillation.

Preferred forms of the apparatus are shown in the drawings, in which—

Figure 1:
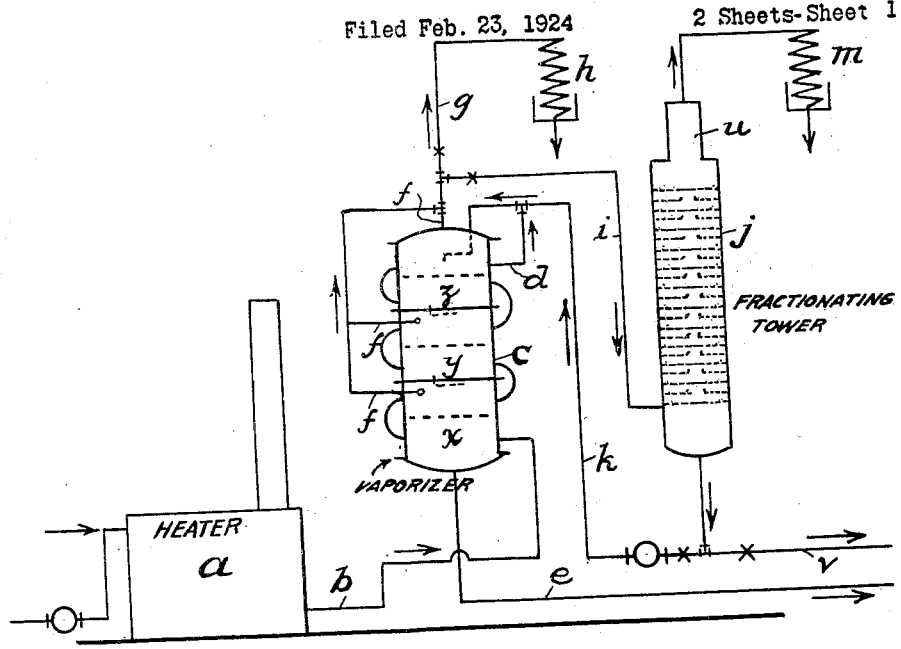
Fig. 1 is a diagram of one form of apparatus.
Figure 2:
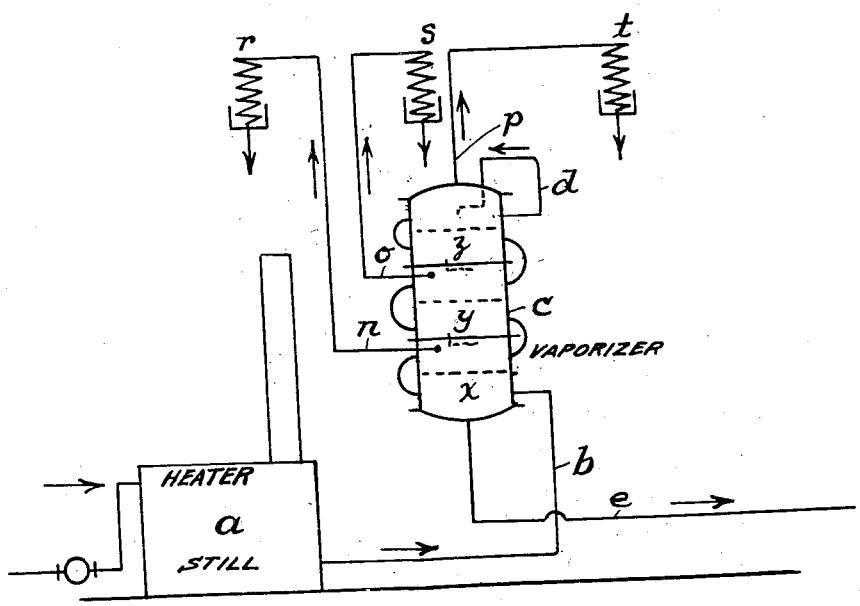
Fig. 2 is a diagram of a modified form of apparatus.

Referring both to Figs. 1 and 2: Through the still $a$, which raises the crude oil to the desired temperature, and line $b$, oil is pumped into and through the tubes of the vaporizer $c$ (hereinafter specifically described), the oil thence flowing out the upper part of the vaporizer and back through the pipe $d$ into the vaporizer and thence down over said tubes, the lower boiling point fractions being vaporized and the residual oil flowing out through pipe $e$.

Referring specifically to Fig. 1: $f$, $f$, $f$, are manifolds through which evolved vapors are led through line $g$ to a condenser $h$, or through line $i$ to a fractionating tower $j$. By line $k$ the condensate from this tower returns to pipe $d$ and thence to the vaporizer, the uncondensed vapors passing from the tower to a condenser $m$.

Referring specifically to Fig. 2: $n$, $o$, $p$, are manifolds through which evolved vapors are led to separate condensers $r$, $s$ and $t$ respectively.

Figure 3:
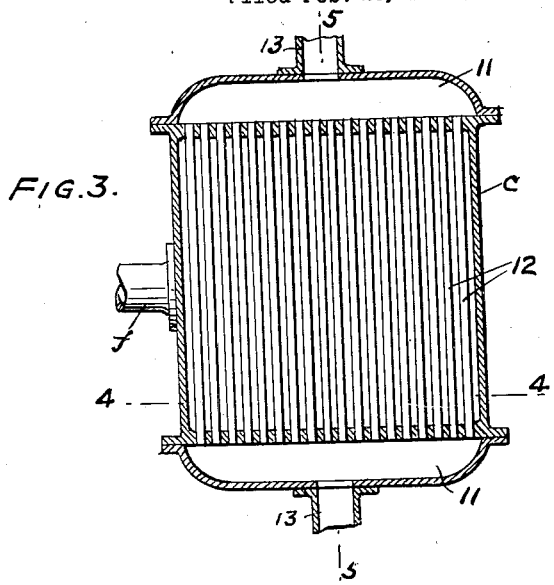
Fig. 3 is a horizontal section through the vaporizing fractional distilling unit, on the line 3—3 of Fig. 4.
Figure 4:
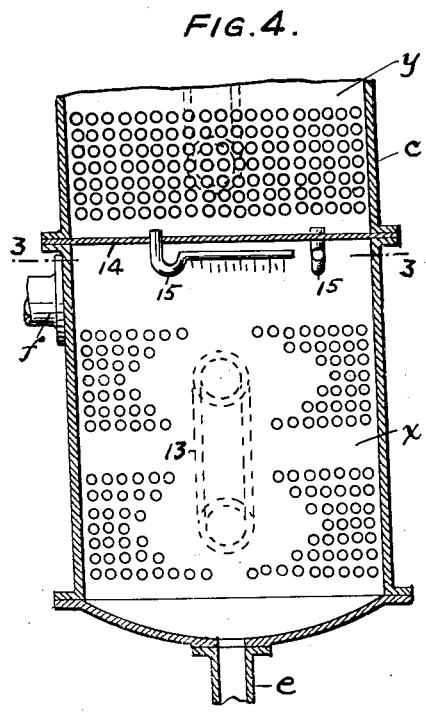
Fig. 4 is a vertical section on the line 4—4 of Fig. 3.
Figure 5:
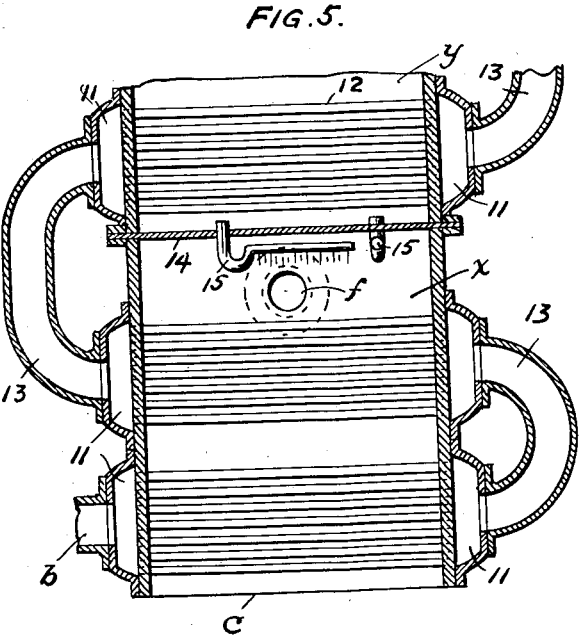
Fig. 5 is a vertical section on the line 5—5 of Fig. 3.

Referring to Figs. 3, 4 and 5, wherein the vaporizing fractional distilling unit $c$ is shown in detail: The interior of the casing $c$ is divided, by horizontal partitions 14, into as many compartments, or vaporizing sections, as may be desired. Three sections, $x$, $y$, and $z$, are shown. Any number of sections may be provided. At opposite sides of the casing are headers 11. Connecting opposite headers 11 are tubes 12. Connecting one of the lower headers 11 on section $x$ with the upper header 11 on the same side of section $x$ is a curved tube 13. A similar curved tube 13 connects the other upper header 11 on section $x$ with the lower header on the same side of section $y$. Similar curved tubes connect other adjacent headers. Each of the horizontal partitions 14 carries a number of pipes 15 adapted to receive unvaporized oil from the compartment above it and convey such oil into the compartment below it, the section of the pipe below the partition 14 extending horizontally and orificed along its length to effect the desired distribution of the oil.

Crude oil from the still $a$ and pipe $b$ enters a lower header 11 of the lower vaporizer section $x$ and thence flows through a set of tubes 12 into the other lower header of section $x$, thence through a curved tube 13 into the adjacent upper header of section $x$, and thence successively through the remaining sets of tubes and headers in the staggered path shown in Fig. 5; finally flowing out the tube $d$ and discharging into the top of the open space within section $z$.

In passing downward over the tubes in section $z$, vapors are generated and led off by the upper of the three manifolds $f$, Fig. 1, or by manifold $p$, Fig. 2. Unvaporized oil flows out of the section $z$ through pipes 15 and passes down over the tubes in section $y$, wherein more vapors are generated and outflow through the corresponding manifold. Unvaporized oil from section $y$ is conveyed through pipes 15 and flows down over the tubes in section $x$, wherein still more vapors are generated and escape through the corresponding manifold.

The oil, in the course of its downward flow over the tubes 12, spreads over the outer surfaces of the tubes in a thin film, so that the heating action is intensive and insures the complete vaporization of all fractions having boiling points below the temperatures of the different sets of tubes. It will be understood that the temperature within the several sections of the fractionator progressively falls from the bottom to the top, so that only the lightest fractions are vaporized in section $z$ while progressively heavier fractions are vaporized in sections $y$ and $x$.

The residual oil flowing out through pipe

*e* may go to storage or may be subjected to further fractional distillation.

In Fig. 1, the vapors from all the manifolds may go to a condenser *h* and thence to storage; or they may be led off through vapor line *i* into the bottom of a fractionating tower *j*. This fractionating tower may be of any suitable construction, but it is preferred to construct it in accordance with the tower illustrated in Fig. 2 of our application filed of even date herewith, Serial No. 694,470. The vapors rise through this tower to a reflux condenser *u*, which returns the heavier fractions and passes the lighter to a condenser *m* and thence to storage. The returned or refluxed condensate is pumped through line *k* to pipe *d*, and flows, along with oil that has just passed through the series of tubes 12, into section *z* of vaporizer *c*. If desired, this reflux or condensate may be run to storage through line *v*.

No special means need be adapted to regulate the pressure throughout the system, but if desired any predetermined absolute pressure may be obtained, by known means, from super-atmospheric pressure to a high degree of vacuum. The system is especially adapted to vacuum distillation, and it is preferable to use a high degree of vacuum, varying from an absolute pressure not exceeding twenty-five millimeters mercury down to as near zero pressure as is practicable.

Having now fully described our invention, what we claim and desire to protect by Letters Patent is:

1. A fractional distilling apparatus comprising a casing, partitions dividing the casing into a plurality of sections one above another, a plurality of sets of tubes, one set above another, in each section, each set of tubes comprising a multiplicity of tubes extending alongside one another at different levels, a source of hot oil, means to convey a stream of hot oil from said source and distribute the oil to the tubes of the lower set of the lower section, means to convey oil from the tubes of one set of each section and distribute the oil to the tubes of a higher set of such section, means to convey the oil from the tubes of the upper set of each section below the upper section and distribute the oil to the tubes of the lower set of the section above, means to admit oil to the uppermost section outside said tubes, and means communicating with opposite sides of each partition and allowing oil flowing outside said tubes to pass downwardly through successive sections.

2. A fractional distilling apparatus of the character described comprising a casing, partitions dividing the casing into a plurality of sections one above another, sets of tubes within the several sections, each set comprising a multiplicity of tubes extending alongside one another at different levels, a source of hot oil, means adapted to convey a stream of hot oil from said source and distribute the oil to the tubes of the lower set, means to convey oil that has passed through the tubes of one set and distribute the oil through the tubes of a higher set, means to convey oil to the interior of the upper section, means allowing oil to pass from the interior of a higher section to the interior of a lower section, vapor outlets from the several sections, vapor condensing means, a fractionating tower, pipe connections from the vapor outlets, a pipe connection from the first named pipe connections to the vapor condensing means, a pipe connection from the first named pipe connections to the fractionating tower, and a pipe connection from the bottom of the tower communicating with the interior of the upper section.

3. A fractional distilling apparatus of the character described comprising a casing, a plurality of sets of tubes extending through the casing and through opposite walls thereof, headers outside said walls, each header communicating with the tubes of one set, pipe connections each of which connects two headers outside the same casing wall communicating with two adjacent sets of tubes, said sets of tubes being arranged in pairs, a partition separating each pair of sets of tubes from an adjacent pair of sets of tubes, and means allowing a flow of oil over the tubes and through the partitions.

4. The process of fractionating mineral oil which comprises heating oil to a temperature substantially above that required to vaporize its lightest fractions, flowing a stream of such hot oil toward a confined space, dividing said stream into a multitude of fine streams and flowing said streams in multiple in confined paths in one direction through said confined space, consolidating said streams and then again dividing into a multitude of fine streams and flowing said streams in multiple in confined paths through said confined space above the first named confined paths and in a direction opposite to the direction first specified, subsequently again consolidating said streams and flowing the oil toward another superposed confined space and dividing the oil into fine streams and flowing them in multiple in opposite directions through the second confined space in the same manner as through the first confined space, and subsequently flowing said oil downwardly through said spaces out of contact but in heat exchange relation with the oil flowing in each space in opposite directions through the different sets of conned paths, thereby effecting vaporization in said confined space of successively higher boiling fractions of the oil.

5. The process of vaporizing mineral oil which comprises heating oil to a temperature required to vaporize the heaviest constituents that it is desired to vaporize, flowing a stream of such hot oil toward a vaporizing chamber, dividing said stream into a multitude of fine streams and flowing said streams in multiple in confined spaced-apart paths repeatedly through said vaporizing chamber and at successively higher elevations, consolidating the multitude of fine streams after they flow through said vaporizing chamber at one elevation and before they flow through the vaporizing chamber at a higher elevation, and after the oil has so flowed through the vaporizing chamber at the highest elevation again consolidating the flowing oil and allowing it to flow downward through said vaporizing chamber and so disseminating it in its downward flow that it passes into heat-exchange relation, but out of contact, with said multiple hot oil streams and distributes itself in thin films in heat-exchange relation with successively hotter oil streams at successively lower elevations so as to produce an intensive heating action and progressive fractional vaporization and the substantially complete vaporization of fractions having boiling points below the progressively rising temperatures to which the downflowing distributed and disseminated oil is subjected.

6. The process set forth in claim 5 wherein the vaporizing chamber is maintained under a vacuum.

7. The process set forth in claim 5 wherein the progressively fractionated vapors are consolidated and a fraction thereof condensed and the condensate caused to flow downward through the vaporizing chamber with the oil that has just completed its upward flow therethrough.

In testimony of which invention, we have hereunto set our hands, at Philadelphia, Pa., on this 14th day of February, 1924.

ARTHUR E. PEW, Jr.
HENRY THOMAS.